United States Patent
Steindorf et al.

(10) Patent No.: US 11,639,577 B2
(45) Date of Patent: May 2, 2023

(54) METHOD AND SYSTEM FOR FORMING PLEATS IN A TEXTILE PRODUCT IN A PRODUCTION LINE

(71) Applicant: O&M Halyard, Inc., Mechanicsville, VA (US)

(72) Inventors: Eric C. Steindorf, Roswell, GA (US); Anthony S. Spencer, Woodstock, GA (US); Joseph P. Weber, Suwanee, GA (US); Mark T. Pamperin, Cumming, GA (US); David L. Harrington, Cumming, GA (US)

(73) Assignee: O&M Halyard, Inc., Mechanicsville, VA (US)

( * ) Notice: Subject to any disclaimer, the term of this patent is extended or adjusted under 35 U.S.C. 154(b) by 357 days.

(21) Appl. No.: 16/645,244

(22) PCT Filed: Oct. 4, 2017

(86) PCT No.: PCT/US2017/055027
§ 371 (c)(1),
(2) Date: Mar. 6, 2020

(87) PCT Pub. No.: WO2019/070247
PCT Pub. Date: Apr. 11, 2019

(65) Prior Publication Data
US 2020/0283948 A1    Sep. 10, 2020

(51) Int. Cl.
*D06J 1/10*  (2006.01)
*B29C 53/26* (2006.01)
(Continued)

(52) U.S. Cl.
CPC .............. *D06J 1/10* (2013.01); *B29C 53/26* (2013.01); *B29C 53/84* (2013.01); *D06J 1/02* (2013.01)

(58) Field of Classification Search
CPC ................................. B29C 53/26; B29C 53/84
See application file for complete search history.

(56) References Cited

U.S. PATENT DOCUMENTS 3,349,159 A * 10/1967 Luboshez .............. B29C 53/22
                                                          425/371
3,462,043 A    8/1969 Frick
(Continued)

FOREIGN PATENT DOCUMENTS

CN    202989634 U    6/2013
DE    19549229 A1 *  7/1997 ............ B65H 45/10
(Continued)

OTHER PUBLICATIONS

International Search Report and Written Opinion for PCT/US2017/055027, dated Jul. 3, 2018, 15 pages.

*Primary Examiner* — F Griffin Hall
(74) *Attorney, Agent, or Firm* — Dority & Manning, P.A.

(57) ABSTRACT

An automated method is provided for forming pleats in a textile product in a production line. The method includes conveying a web of the textile product on a conveyor in the production line. The web is folded using a folding board at a folding station in the production line. The method includes removing heat from the folding board. The automated method can allow for high speed folding of the textile product without damaging the textile product from heat caused by friction between the web of textile product and the folding board.

24 Claims, 10 Drawing Sheets

(51) Int. Cl.
*B29C 53/84* (2006.01)
*D06J 1/02* (2006.01)

(56) References Cited

U.S. PATENT DOCUMENTS

| | | | |
|---|---|---|---|
| 4,519,531 A | * | 5/1985 | Clerici .................. D06J 1/06 |
| | | | 223/30 |
| 4,576,611 A | | 3/1986 | Pascoe, Sr. |
| 7,854,046 B2 | | 12/2010 | Horn et al. |
| 9,643,812 B2 | | 5/2017 | Orndorff |
| 2001/0050136 A1 | | 12/2001 | Veeser et al. |
| 2015/0251871 A1 | | 9/2015 | Orndorff |

FOREIGN PATENT DOCUMENTS

| | | |
|---|---|---|
| DE | 19549229 A1 | 7/1997 |
| GB | 1 433 910 A | 4/1976 |
| GB | 1 593 600 A | 7/1981 |
| JP | 2009293163 A * | 12/2009 |
| JP | 2009293163 A | 12/2009 |
| KR | 19980087696 A | 12/1998 |
| SU | 705034 A2 | 12/1979 |
| WO | WO 2007/079502 A2 | 7/2007 |

\* cited by examiner

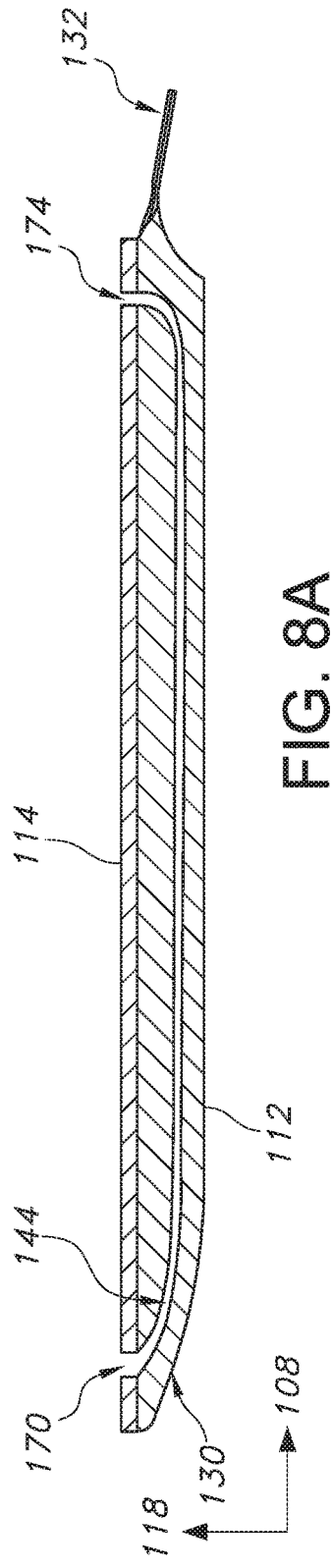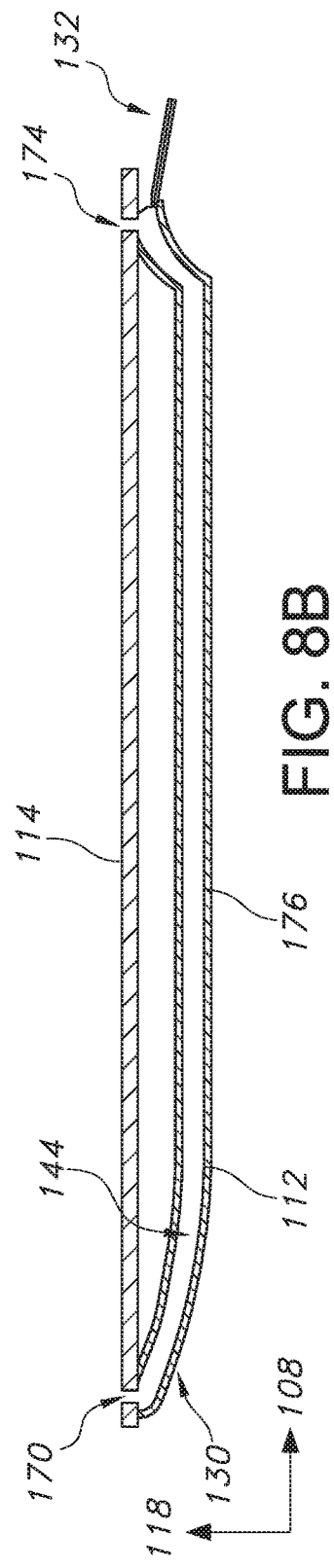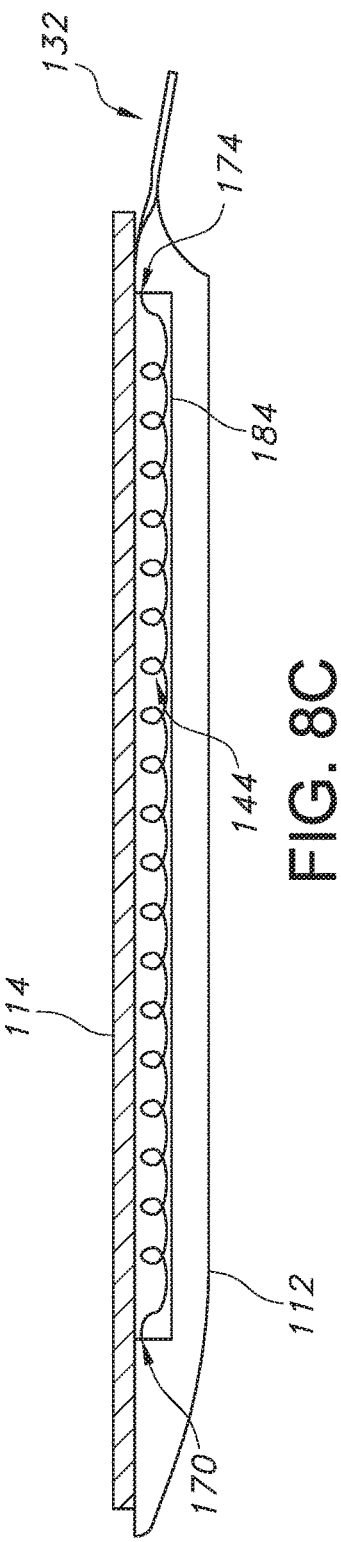

METHOD AND SYSTEM FOR FORMING PLEATS IN A TEXTILE PRODUCT IN A PRODUCTION LINE

RELATED APPLICATION

The present application is the national stage entry of and claims priority to International Patent Application No. PCT/US2017/055027, having a filing date of Oct. 4, 2017, the entire contents of which are incorporated herein by reference.

FIELD OF THE INVENTION

The present invention relates generally to the field of textile production, such as the production of protective facemasks, and more specifically to a method and system for forming pleats in a textile product.

BACKGROUND OF THE INVENTION

The use of face masks and other personal protective equipment (PPE) such as surgical gowns, surgical drapes, bouffant caps, etc., is a recommended practice in the healthcare industry to help prevent the spread of disease. For instance, face masks worn by healthcare providers help reduce the spread of infections by filtering the air exhaled from the wearer thus reducing the number of harmful organisms or other contaminants released into the environment. Similarly, face masks help reduce the spread of infections by filtering the air inhaled by the wearer thus protecting the wearer.

This is especially important to slow and stop the spread of outbreaks or epidemics of infectious diseases, such as *Mycobacterium tuberculosis* (TB), the Avian influenza (H7N9) virus, the Middle East respiratory syndrome coronavirus (MERS-CoV), the H1N1 virus, etc. Healthcare providers may wear masks when treating patients suspected of infection with known or unknown viral or bacterial diseases, and similarly, such patients may use face masks to prevent the spread of disease by filtering and containing any expelled bacteria or viruses. Once an outbreak of an epidemic disease is detected, for example to a pandemic level, the need for face masks, respirators, and other PPE may rapidly increase, outpacing supply and causing a temporary shortage. Thus, high speed manufacturing of face masks and other PPE is critical to quickly respond to this surge in demand and contain the outbreak or epidemic.

Face masks, along with other PPE, often contain pleated fabrics or materials. Other products, such as tissue paper and diapers, may similarly contain pleated or folded materials. During high speed production of these products, the fabric is often pleated or folded by drawing it over or through an apparatus known as a folding board. Folding boards generally have one or more appendages that force the fabric into the desired folded or pleated arrangement.

Friction between the fabric and folding board generates heat. At high rates of production, this heat can accumulate, heating the folding board, nearby equipment, or the fabric itself above appropriate operating temperatures and causing undesirable defects or damage to the equipment, fabric, or both.

This heat accumulation is a function of both heat generation rate and heat dissipation rate. Several factors contribute to the heat generation rate including the fabric's physical properties, the speed at which it is drawn over the folding board, and the folding board's shape and material properties. The rate that heat dissipates through convection and conduction similarly depends on the folding board's characteristics, and, additionally, on the movement of air surrounding the folding boards.

Heat accumulation between the folding board and fabric can undesirably limit the production rate of pleated materials, such as face masks. As such, a need exists for a folding board apparatus and an associated method of use that reduces heat accumulation to allow for increased manufacturing speeds. In particular, a need exists for a folding board that generates less friction heat, more effectively dissipates such heat, or both, and thus allows for increased production rates compared to prior art systems.

SUMMARY OF THE INVENTION

Objects and advantages of the invention will be set forth in the following description, or may be obvious from the description, or may be learned through practice of the invention.

In accordance with aspects of the invention, an automated method is provided for forming pleats in a textile product in a production line. The method includes conveying a web of the textile product. The web is folded using a folding board at a folding station in the production line. The method includes removing heat from the folding board.

In a particular embodiment, the method includes maintaining the folding board at a temperature less than about 350° F. during production. In some embodiments, the web may be conveyed at a rate between about 200 feet per minute and about 900 feet per minute.

In a particular embodiment, removing heat from the folding board includes at least one of providing a stream of air directed at the folding board, providing a flow of a liquid through the folding board, providing the folding board with a discontinuous surface, and providing a thermal fin along at least one of the folding board or a structure thermally connected thereto.

In another particular embodiment, removing heat from the folding board includes providing a thermal fin attached to at least one of the folding board and a structure thermally connected thereto.

In another particular embodiment, removing heat from the folding board includes providing a flow of air directed at an outer surface of the folding board adjacent a contact location where the folding board contacts the web.

In another particular embodiment, removing heat from the folding board includes providing a flow of a fluid through a passageway within the folding board. In one embodiment, the fluid may be a gas and may exit the passageway through at least one outlet disposed adjacent a contact surface of the folding board, and the contact surface of the folding board may contact the web. In one embodiment, removing heat from the folding board includes cooling the fluid. In one embodiment, removing heat from the folding board further includes recycling the fluid through a closed circuit. In some embodiments, the cooling fluid is a liquid.

In accordance with other aspects of the invention, an automated production line system is provided for forming pleats in a web of a textile product in a production line. The system includes a conveyor on which the web of the textile product is conveyed. The system also includes a folding board assembly including a pair of folding boards. The folding board assembly is configured to fold the web as the web passes through the folding board assembly, and the folding board assembly is configured to remove heat from at least one of the pair of folding boards.

In a particular embodiment, the folding board assembly is configured to maintain the pair of folding boards at a temperature less than about 350° F. while the conveyor conveys the web at a rate between about 200 feet per minute and about 900 feet per minute.

In another particular embodiment, the folding board assembly of the automated production line system includes at least one of a cooling system configured to remove heat from at least one of the pair of folding boards using a cooling fluid, such as a gas or liquid, and a thermal fin thermally connected to the folding board assembly to remove heat from at least one of the pair of folding boards.

In another particular embodiment, the folding board assembly includes a cooling system configured to cool the pair of folding boards using a cooling fluid. In one embodiment, at least one of the pair of folding boards includes a passageway through which the cooling system is configured to provide the cooling fluid. In another particular embodiment, the folding board assembly includes a heat exchanger configured to cool the cooling fluid as the cooling fluid flows through the heat exchanger. In another particular embodiment, the folding board assembly includes a structure thermally coupled to at least one of the pair of folding boards, and wherein the cooling system is configured to provide the cooling fluid through the structure. In another particular embodiment, the cooling system is a closed circuit system. In another particular embodiment, the cooling system includes a tube disposed within at least one of the pair of folding boards, and the cooling system is configured to circulate the cooling fluid through the tube. In some embodiments, the cooling fluid may be a liquid. In other embodiments, the cooling fluid may be a gas. In another particular embodiment, at least one of the pair of folding boards further includes a surface contacting the web and an outlet disposed adjacent the surface, and wherein the outlet is in fluid communication with the passageway such that the gas flows out through the outlet.

In another particular embodiment, the cooling fluid is air and the cooling system is configured to provide an external flow of air directed at a contact area between at least one of the pair of folding boards and the web.

In another particular embodiment, at least one of the pair of folding boards has a discontinuous surface. In one embodiment, the pair of folding boards is arranged such that the discontinuous surface contacts the web. In another particular embodiment, the discontinuous surface includes dimples, bumps, holes, slots, grooves or a combination thereof. In another particular embodiment, the pair of folding boards are interleaved. In another particular embodiment, at least one of the pair of folding boards includes a plurality of appendages protruding therefrom and a discontinuous surface defined by the plurality of appendages. In another particular embodiment, at least one of the plurality of appendages has a height less than a maximum height of the folding board from which the plurality of appendages protrudes.

In another particular embodiment, at least one of the plurality of appendages has a height between 20% and 95% of the maximum height of the folding board from which the plurality of appendages protrudes. In another particular embodiment, at least one of the pair of folding boards includes a roller at an interface between the web and the folding board. In another particular embodiment, the folding board assembly includes a plate generally parallel to a machine direction and a cross-machine direction of the production line, wherein at least one of the pair of folding boards has a leading edge and a trailing edge extending generally in the machine direction, wherein the trailing edge is offset from the leading edge in the cross-machine direction. In another particular embodiment, the leading edge extends from the plate in a direction generally perpendicular to the plate, and wherein the trailing edge is oriented in a direction generally parallel to the plate.

In accordance with aspects of the invention, an automated method is provided for forming pleats in a textile product in a production line. The method includes conveying a web of the textile product on a conveyor in the production line at a rate between about 200 feet per minute and about 900 feet per minute. The method includes, at a folding station in the production line, folding the web using a folding assembly including a plurality of rollers. The method includes maintaining the plurality of rollers at a temperature less than about 350° F. during production.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 8a through 8h are diagram views of various embodiments of a folding board.

Figure 1:
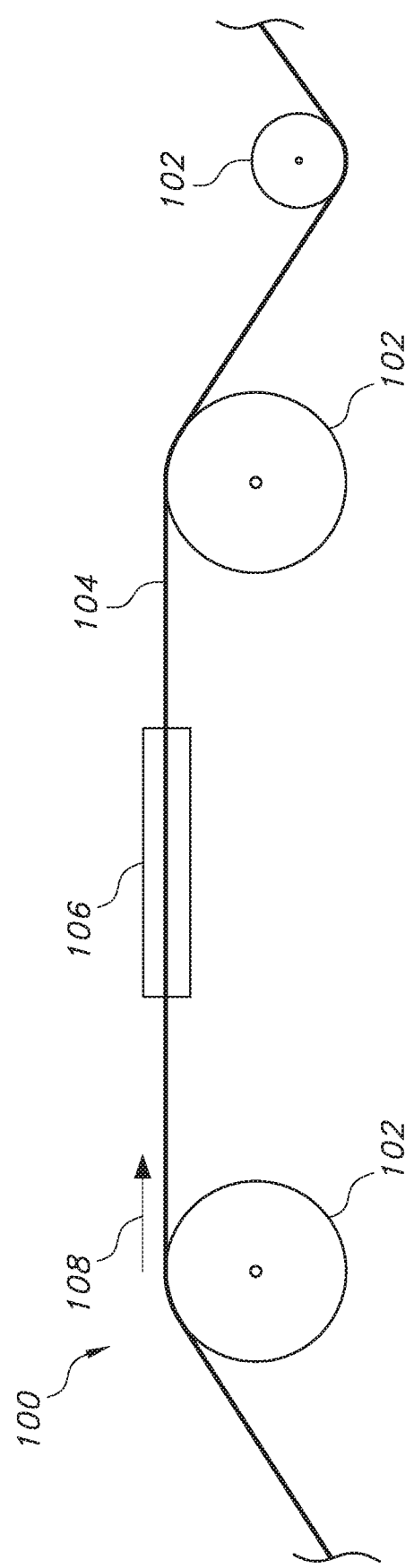
FIG. 1 is a schematic drawing of a automated production line system.

Repeat use of reference characters in the present specification and drawings is intended to represent the same or analogous features or elements of the present invention.

DETAILED DESCRIPTION OF
REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents. For the purposes of this application, like features will be represented by like numbers between the figures.

Generally speaking, the present invention is directed to an automated method for forming pleats in a textile product in a production line and an automated production line system for the same. The automated production line system can include a conveyor which conveys the web at a rate between about 200 feet per minute and about 900 feet per minute, for example. For purposes of this invention, the term "textile product" includes a web that has a structure of individual fibers or threads which are interlaid, but not in an identifiable, repeating manner—commonly referred to as a "nonwoven web". Nonwoven webs have been, in the past, formed by a variety of processes such as, for example, meltblowing processes, spunbonding processes, and bonded carded web processes. The term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. The term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms.

The automated production line system may include a folding board assembly having a pair of folding boards. The folding board assembly is configured to fold the web as the web passes through it. For example, as the web passes through the folding board assembly, the pair or folding boards may fold the web as it passes through the folding board assembly. During this process, friction between the web and the folding board assembly generates heat, increasing the folding board assembly's temperature and heating the web. Many textile products are sensitive to heat, however, and are subject to damage at raised temperatures. Such damage may reduce the textile product's aesthetic appeal by discoloring or deforming portions of the material, and, in severe cases, may form holes or other deformations rendering the textile product completely unusable.

Examples of textile products that may be folded using the disclosed system and method include various products formed from polypropylene, polyethylene, or polyester, for example. These materials may include, for example, fiber-grade spunbond polypropylene (SBPP), fiber-grade meltblown polypropylene (MBPP), and low density polyethylene (LDPE). A web of any suitable textile product, however, may be folded using the automated production line system and method disclosed herein. In any event, the materials have respective melting points at which the materials will be damaged from excessive heat. For example, fiber-grade SBPP generally has melting temperatures in the range of 220° F. to 290° F., while fiber-grade MBPP generally has melting temperatures in the range of 270° F. to 310° F. Additionally, fiber-grade LDPE generally has melting temperatures in the range of 255° F. to 275° F.

As such, to prevent damage to temperature-sensitive materials, in some embodiments, the folding board assembly may be maintained at a temperature of less than about 350° F. during production while the web is conveyed at a rate between about 200 feet per minute and about 900 feet per minute. In other embodiments, however, the folding board assembly may be used to fold materials with even greater temperature sensitivity, and thus may be maintained at a lower temperature. For example, in some embodiments, the folding board assembly may be maintained at a temperature less than about 325° F. In other embodiments, the folding board assembly may be maintained at a temperature less than about 300° F. In other embodiments, the folding board assembly may be maintained at a temperature less than about 275° F. In other embodiments, the folding board assembly may be maintained at a temperature less than about 250° F. In some embodiments, the folding board assembly may be maintained at a temperature less than about 240° F. In other embodiments, the folding board assembly may be maintained at a temperature less than about 220° F., and in other embodiments the folding board assembly may be maintained at a temperature less than about 200° F. The folding board may be maintained at even lower temperatures still depending on the properties of the textile product being folded. As used herein, "about" is used to encompass values falling within ±5% of the recited value.

Active or passive cooling systems and methods may be used to remove heat from the folding boards and maintain the folding board assembly's temperature and prevent excessive heating of the folding board assembly. For example, the automated production line system may include a cooling system configured to cool the pair of folding boards using a cooling fluid. The cooling system may move the cooling fluid through a passageway within one of the folding boards, around an exterior of the folding boards, or both. This cooling system may include a pump, fan, or other means of moving the fluid, which may be a liquid or gas, to cool the pair of folding boards. Alternatively, or in addition to the above-described cooling system, in some embodiments, the folding board assembly may be configured to increase its passive cooling. For example, a thermal fin may be thermally connected to the folding board assembly to improve heat dissipation, the folding boards may be designed to minimize friction with the web to reduce heat generation, or a combination thereof.

FIG. 1 depicts an automated production line system 100 for forming pleats or folds 110 in a web 104 of a textile product in a production line. The production line system 100 has one or more conveyors 102 on which the web 104 of the textile product is conveyed during production. The conveyors 102 may generally be rollers having a cylindrical shape, and the web 104 of the textile product may contact the conveyors 102 around a portion of their respective circumferences. Alternatively the conveyors 102 may be any suitable manner of article conveyor, including, for example, vacuum conveyors. The conveyors 102 convey the web 104 through the folding board assembly 106, shown schematically in FIG. 1.

In some embodiments, the conveyors 102 may convey the web 104 at a rate between about 200 feet per minute and about 900 feet per minute. In some embodiments, the conveyors 102 may convey the web 104 at a rate between about 300 feet per minute and about 900 feet per minute. In some embodiments, the conveyors 102 may convey the web 104 at a rate between about 400 feet per minute and about 900 feet per minute. In some embodiments, the conveyor 102 may convey the web 104 at a rate between about 500 feet per minute and about 700 feet per minute. In other embodiments, the conveyors 102 may convey the web 104 at a rate between about 550 feet per minute and about 750 feet per minute.

Figure 2:
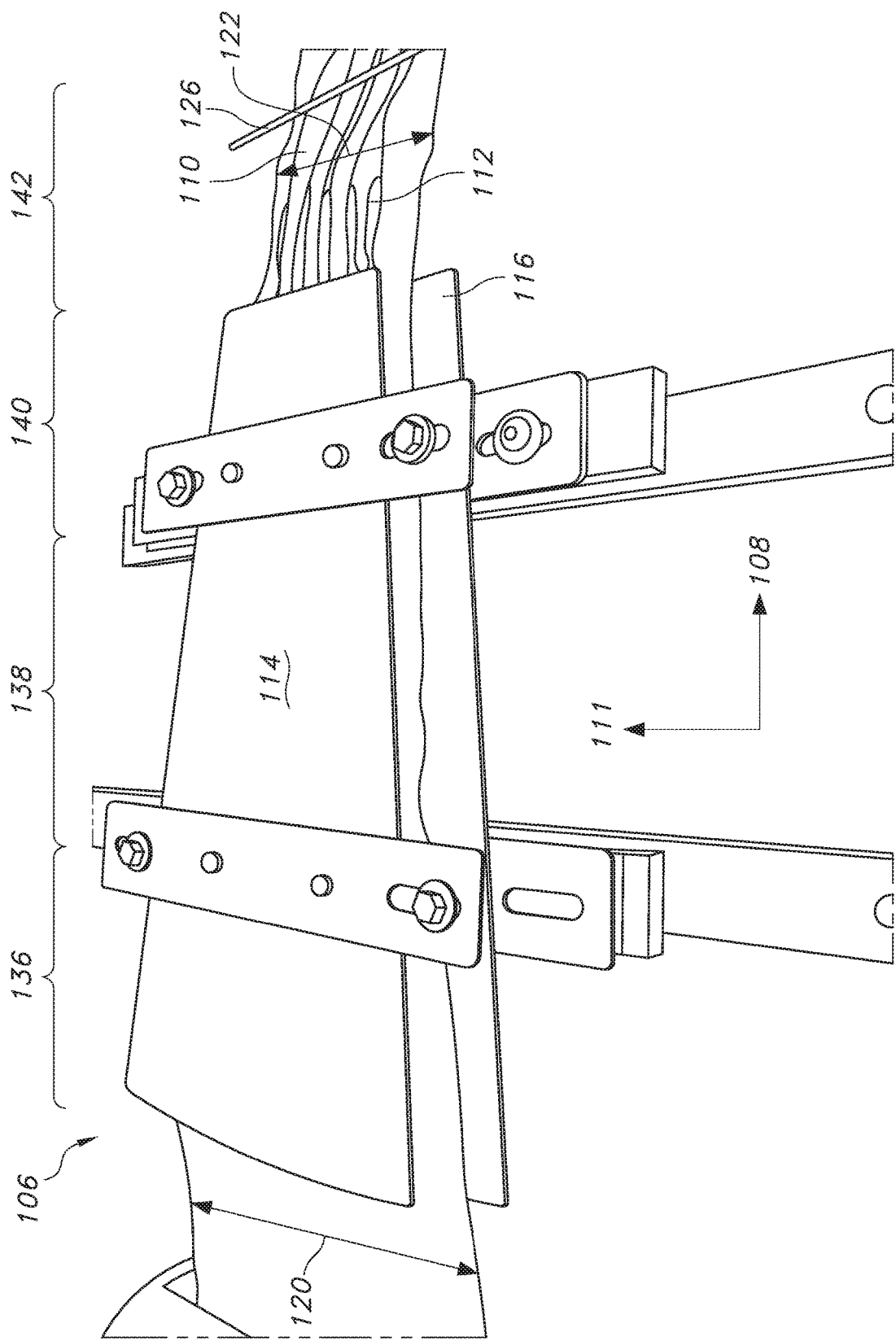
FIG. 2 is a perspective view of a folding board assembly.

FIG. 2 depicts a perspective view of one embodiment of the folding board assembly 106 and the web 104 passing therethrough. The methods and systems disclosed herein, however, are applicable to any suitable folding board assembly. The web 104 enters the folding board assembly 106 in a machine direction 108. The folding board assembly 106 includes one or more plates 114, 116 generally parallel to both the machine direction 108 and a cross-machine direction 111, which is perpendicular to the machine direction 108. A set of upper folding boards 112 are attached to the upper plate 114, and a set of lower folding boards 113 (see FIG. 3) are attached to the lower plate 116. The folding boards, 112, 113 generally extend in the machine direction 108.

The web 104 enters the folding board assembly 106 having a first width 120 in the cross-machine direction 111, and exits the folding board assembly 106 having a second width 122 smaller than the first width 120 in the cross-machine direction 111. By forming pleats 110 in the web 104 the folding board assembly 106 effectively reduces the width of the web 104. Still referring to FIG. 2, a flattening member 126 may be disposed downstream of the folding board assembly 106. The flattening member 126 presses the newly formed pleats 110 to preserve their shape during further processing of the web 104. For example, during further processing, the web 104 may be cut into rectangular pieces and formed into face masks or other suitable articles.

Figure 3:
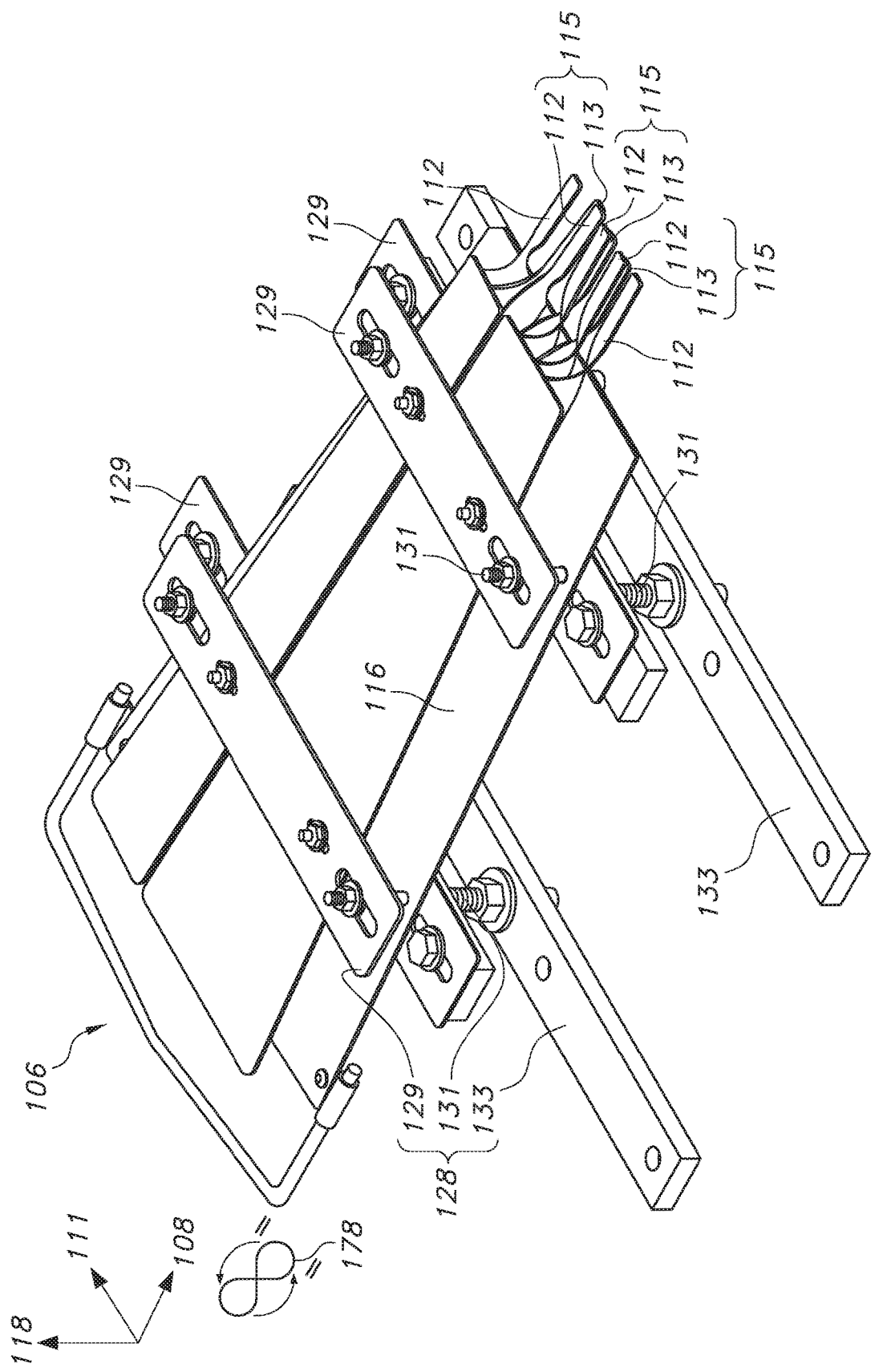
FIG. 3 is an isometric view of the folding board assembly.

FIG. 3 depicts an isometric view of the folding board assembly 106. The folding board assembly 106 includes a support structure assembly 128 configured to support the folding board assembly 106 in the automated production line system 100. The support structure assembly 128 may include one or more brackets 129, fasteners 131, and base members 133. The fasteners 131 and brackets 129 attach the folding board assembly 106 to one or more base members 133. The base members 133 are affixed to a support surface (not shown) using any suitable means. Although the brackets 129 are depicted as elongated members disposed on each sides of the plates 114, 116, any suitable configuration of a support structure assembly 128 may be used to mount the folding board assembly 106 to a support surface. For example, the folding board assembly 106 may be welded, adhered, etc., to the support surface.

Figure 4:
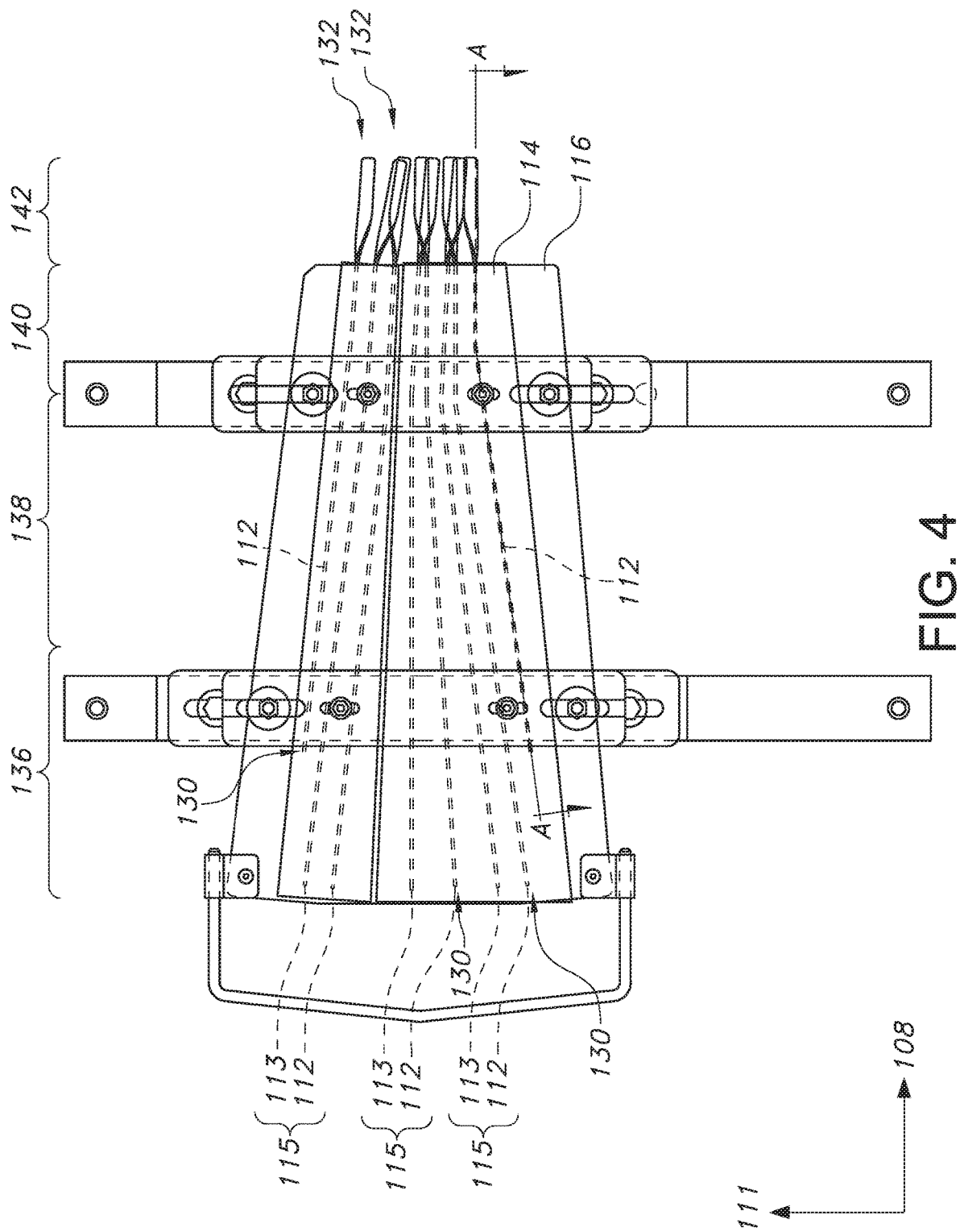
FIG. 4 is a top diagram view of the folding board assembly.
Figure 5:
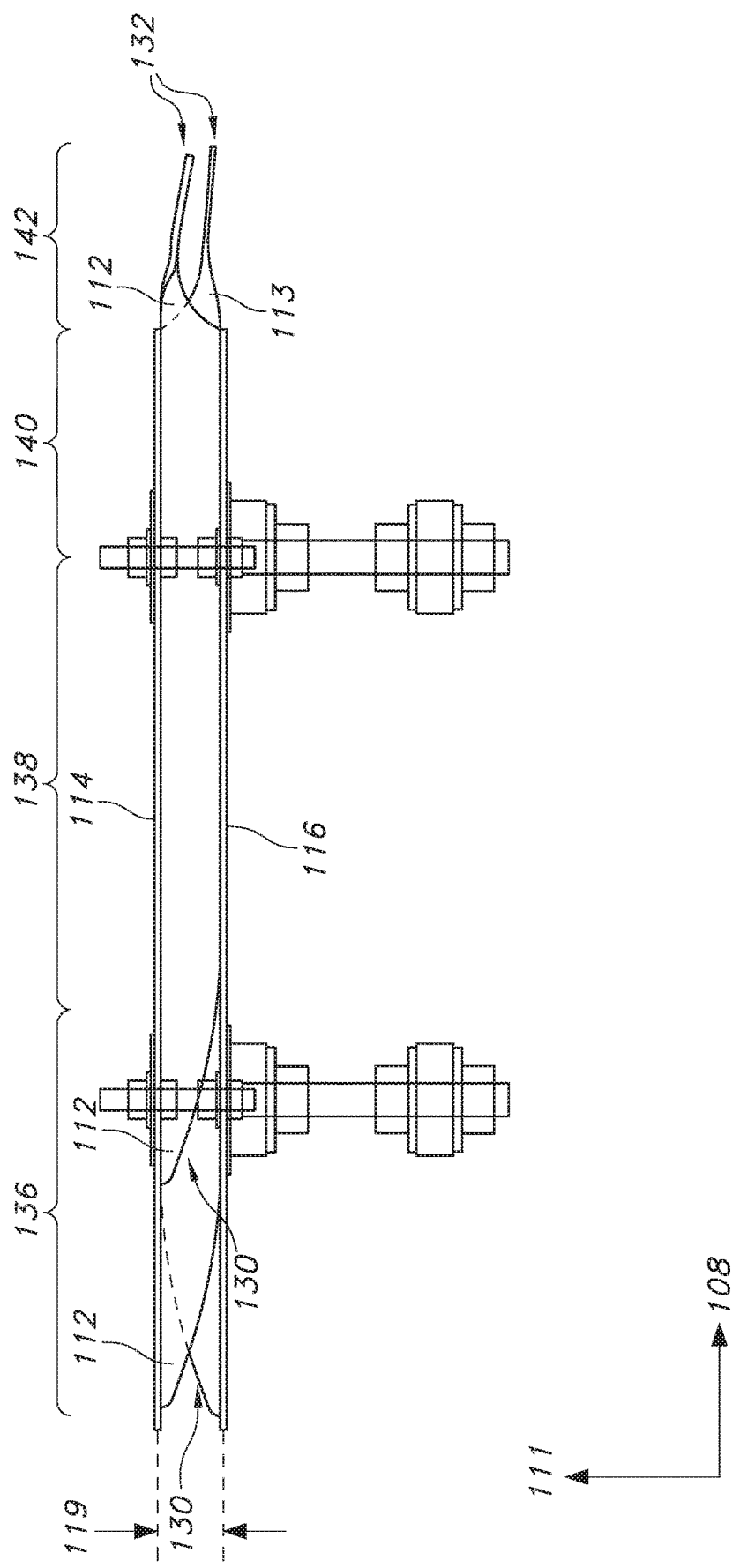
FIG. 5 is a side diagram view of the folding board assembly.

FIGS. 4 and 5 show a top and side view, respectively, of the folding board assembly 106 depicted in FIGS. 2 and 3. The plates 114, 116 are offset by a distance 119 in the Z-direction 118. The Z-direction 118 is perpendicular to both the machine direction 108 and the cross-machine direction 111. The folding board assembly 106 includes three pairs 115 of folding boards 112, 113, and each pair 115 include a respective upper folding board 112 and a respective lower folding board 113. Additionally, in this embodiment, each pair 115 of folding boards 112, 113 is interleaved such that the overall arrangement of folding boards 112, 113 alternate between upper and lower folding boards 112, 113 in the cross-machine direction 111. A single upper folding board 112 can be disposed on each side of the three pairs 115 of folding boards 112, 113.

Referring to both FIGS. 4 and 5, the folding board assembly 106 has four sections 136, 138, 140, 142 along the machine direction 108. The folding boards 112, 113 generally extend in both the machine direction 108 and in the Z-direction 118 between the plates 114, 116. The plates 114, 116 are generally perpendicular to the Z-direction 118. As used herein, "generally" means±20 degrees when referring to the relative angle between two features. As used above, the plates 114, 116 are positioned at an angle between 70 and 100 degrees with respect to the Z-direction 118.

Each of the upper and lower folding boards 112, 113 have a respective leading edge 130 in the first section 136 and a respective trailing edge 132 in the fourth section 142. As shown in FIG. 4, the trailing edges 132 of the folding boards 112, 113 are offset from the leading edges 130 in the cross-machine direction 111 and the machine direction 108. The folding boards 112, 113 generally converge towards a middle of the folding board assembly 106 along the cross-machine direction 111 from the leading edges 130 to the trailing edges 132. The folding board assembly 106 is generally wider at the leading edges 130 of the folding boards 112, 113 than at the trailing edges 132.

As best shown in FIG. 5, in the first section 136 of the folding board assembly 106, the leading edges 130 of the upper folding boards 112 protrude downward from the upper plate 114 in the Z direction 118. Similarly, the leading edges 130 of the lower folding boards 113 protrude upward from the lower plate 116 in the Z direction 118. As the web 104 is conveyed through the folding board assembly 106, in the first section 136, the pairs 115 of the folding boards 112, 113 engage the web 104, forcing it into a 'zig zag' configuration between the folding boards 112, 113. In both the first and second sections 136, 138, the folding boards 112, 113 are angled inward towards the middle of the folding board assembly 106. Thus, as the web 104 is conveyed through the second first and second sections 136, 138 the web 104 is drawn together in the cross-machine direction 111.

In the third section 140, the folding boards 112, 113 generally extend along the machine direction 108 and in a direction perpendicular to the plates 114, 116. Lastly, in the fourth section 142, the folding boards 112, 113 twist along the machine direction 108 such that the folding boards 112, 113 are positioned generally parallel with the plates 114, 116. Further, the respective trailing edges 132 of the folding boards 112, 113, defined as the edges of the folding boards 112, 113 along the cross-machine direction 111, are also generally parallel with the plates 114, 116. As the web 104 is drawn through the fourth section 142, the twisting of the folding boards 112, 113 in the machine direction 108 rotates the 'zig zag' configuration of the web 104 to form the pleats 110.

Figure 6:
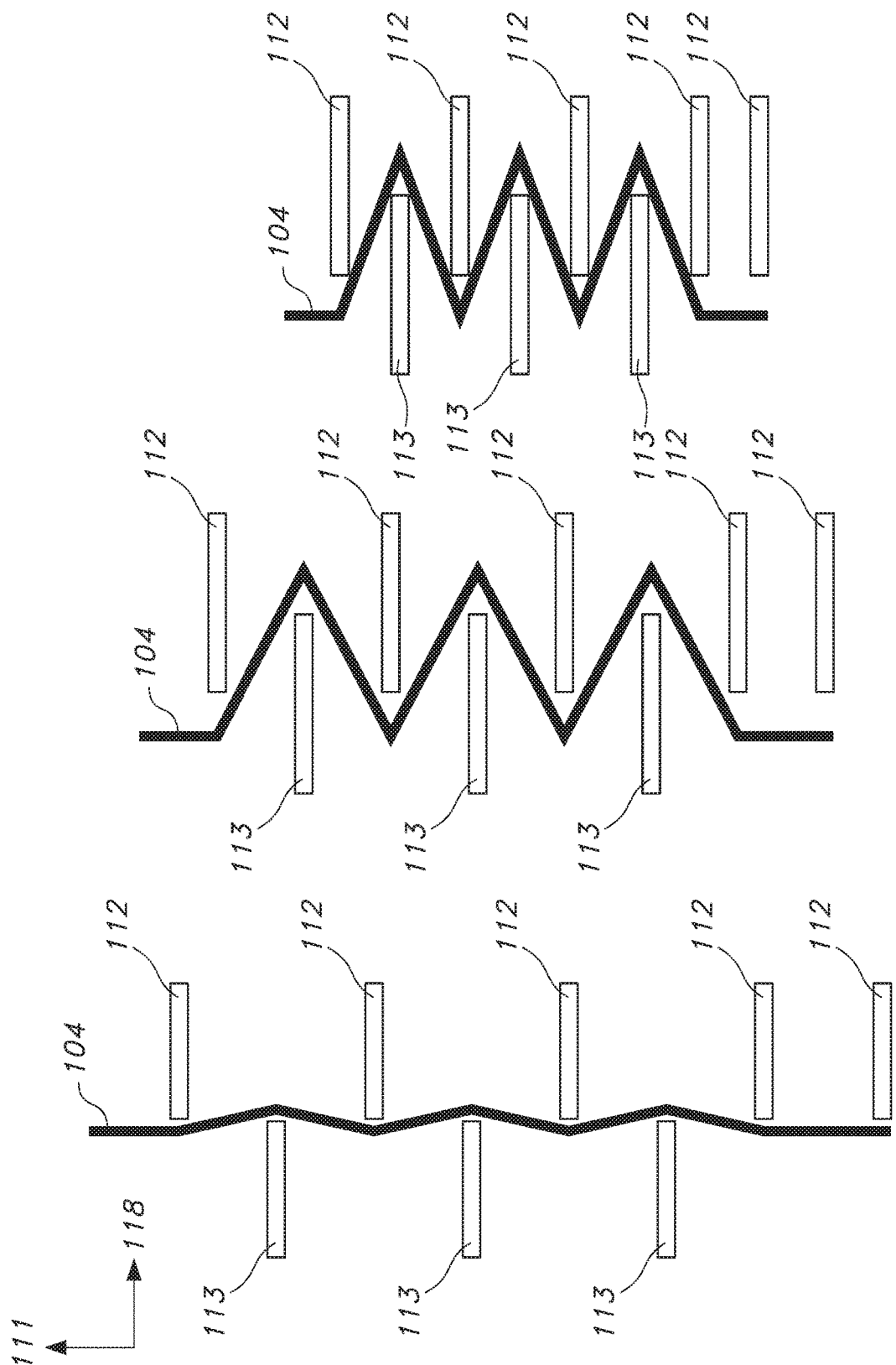
FIG. 6a through 6c are sequential diagram views of the web and folding boards as the web moves in the machine direction through the folding board assembly.

FIGS. 6a-6c illustrate the various shape profiles of the web 104 as the web 104 passes through the first three sections 136, 138, 140, respectively of the folding board assembly 106. In FIGS. 6a-6c the folding boards 112, 113 are depicted rotated 90 degrees from FIG. 5. The plates 114, 116 are omitted for clarity. The web 104 is generally flat in the cross-machine direction 111 prior to entering the folding board assembly 106 (not shown). FIG. 6a shows the general shape of the web 104 in the first section 136 of the folding board assembly 106. The folding boards 112, 113 have arranged the web 104 into a 'zig zag' configuration, but as shown in FIG. 5, in the first section 136, the folding boards 112, 113 do not extend across the full distance 119 between the plates 114, 116. FIG. 6b shows the general shape of the web 104 in the second section 138 of the folding board assembly 106. The folding boards 112, 113 extend farther in the Z-direction 118 between the plates 114, 116 in the second section 138 than in the first section 136, and as a result the 'zig zag' configuration of the web 104 is more pronounced. In the second section 138, the folding boards 112, 113 may extend across most of the distance 119 between the plates 114, 116, while leaving sufficient gaps for the web 104 to pass therethrough. For example, the respective gaps between the upper plate 114 and lower folding boards 113 and between the lower plate 116 and upper folding boards 112 may be between 1.1 times and 4 times larger than a thickness of the web 104. In other embodiments, the folding boards 112, 113 may extend between about 70% and 95% of the distance 119 between the plates 114, 116. In the second section 138, the overall width of the web in the cross-machine direction 111 has been reduced from the first section 136. FIG. 6c shows the general shape of the web 104 in the third section 140 of the folding board assembly 106, and the folding boards 112, 113 have further reduced the width of the web 104 in the cross-machine direction 111 less than initial width 120 of the web 104 shown in FIG. 2. Lastly, as the web 104 is conveyed through the fourth section 142, the folding boards 112, 113 twist along the machine direction 108 to flatten the folds 110 in web 104 as depicted in FIG. 2.

Although described with reference to the embodiment of a folding board assembly depicted in FIGS. 2-5, it should be appreciated that the systems and methods described herein are applicable to any suitable folding board assembly known in the art. For example, in another embodiment, a folding board may extend primarily in the cross-machine direction 111 and Z-direction 118 and have slots formed in the machine direction 108 for arranging the web 104 in a 'zig zag' configuration as the web 104 passes therethrough. In such an embodiment, a second folding board may extend primarily in the machine direction 108 and cross-machine direction 111 to complete the folding of the web 104. In another embodiment, one or more adjacent rollers may have a 'zig zag' profile and may be configured to arrange the web 104 in a 'zig zag' configuration before a folding board flattens the web 104 to finish folding the web.

As discussed above, during pleating of the web 104, friction between the web 104 and the folding board assembly 106 generates heat. Thus, the present invention contemplates a cooling system 150 to dissipate this heat and reduce the operating temperature of the folding board assembly 106. In some embodiments, the cooling system 150 is configured to cool the folding board assembly 106 using a cooling fluid. The cooling fluid may be a liquid or a gas, and, in some embodiments, the cooling fluid may change state between liquid and gas during the cooling process.

Figure 7:
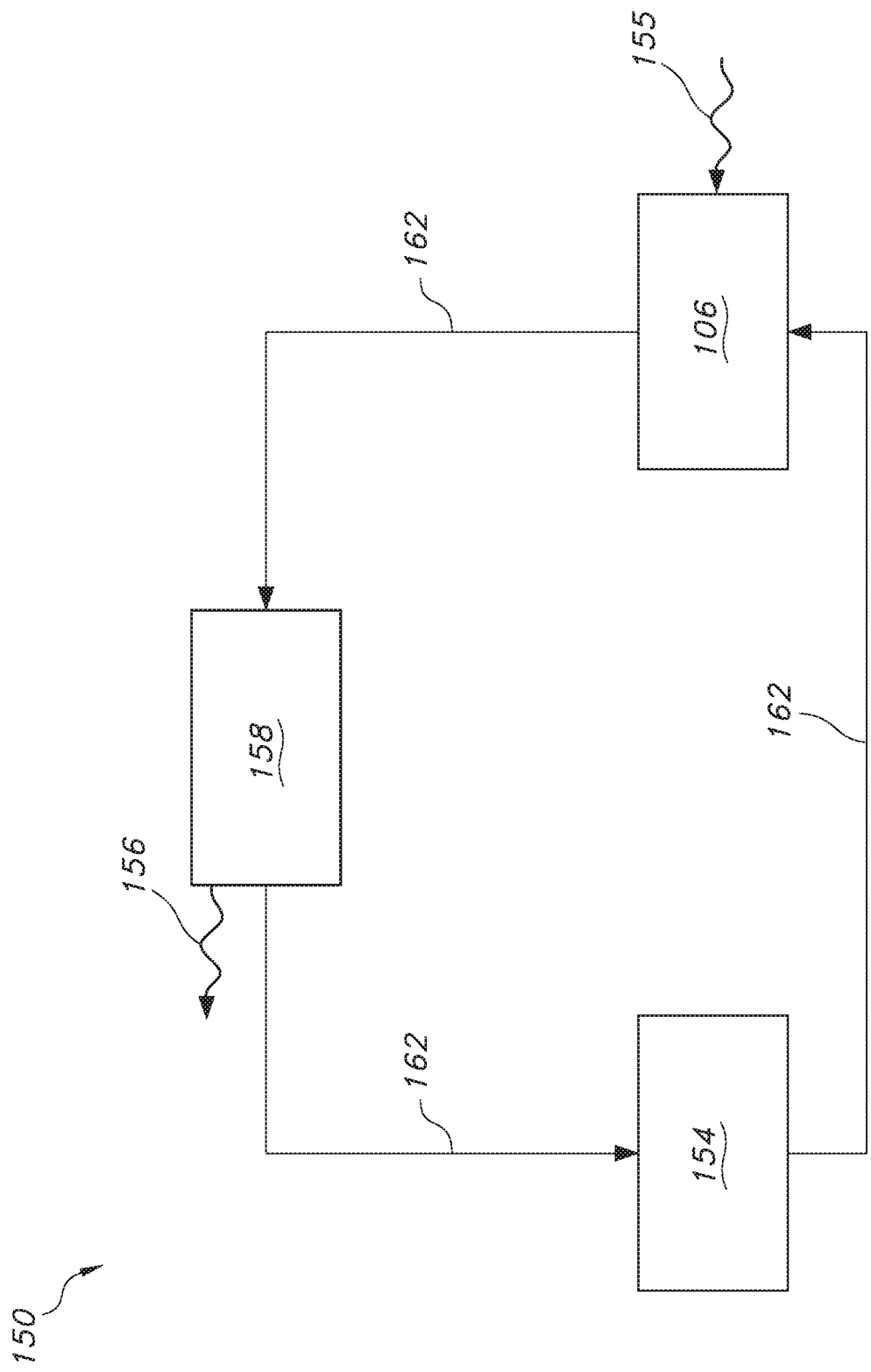
FIG. 7 is a schematic drawing of a cooling system.

A schematic of one embodiment of the cooling system 150 is depicted in FIG. 7. The cooling system 150 includes a pump 154 and a heat exchanger 158 in fluid connection with the folding board assembly 106. The pump 154 provides a flow of the cooling fluid through one or more conduits 162 connecting the pump 154, heat exchanger 158, and folding board assembly 106 to circulate the cooling fluid through the cooling system 150. In this embodiment, the cooling system 150 is a closed circuit system which recycles the cooling fluid received from the heat exchanger 158 back through the folding board assembly 106. The cooling system 150 removes friction heat generated in the folding board assembly 106 (illustrated by arrow 155), and the heat exchanger 158 dissipates the heat to the ambient area (illustrated by arrow 156).

Figure 8D:
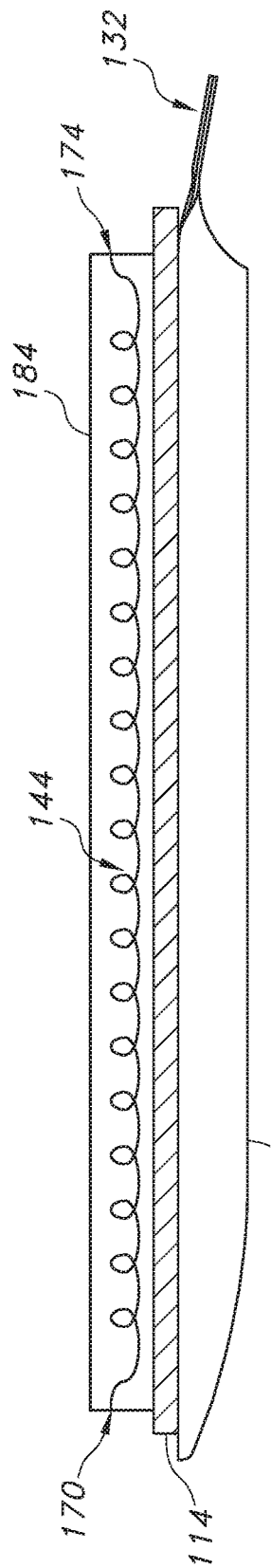

The folding board assembly 106 may include one or more tubes or passageways disposed therein, and the cooling system 150 provides a flow of the cooling fluid through the tubes or passageways to dissipate heat from the folding board assembly 106. FIG. 8a-8e are cross sectional views of various embodiments of a folding board 112 along section A-A in FIG. 4. As shown in FIG. 8a, one or more of the pair 115 of folding boards 112, 113 may include a passageway 144, and the cooling system 150 may be configured to provide the cooling fluid through the passageway 144. FIG. 8a illustrates a cross-sectional view of one embodiment of a folding board 112 having a passageway 144 generally extending in the machine direction 108. The folding board 112 may have an inlet 170 and an outlet 174 fluidly coupled with the passageway 144 such that the cooling system 150 may provide a flow of the cooling fluid into the inlet 170, through the passageway 144, and out the outlet 174. Although illustrated as generally straight along the machine direction 108, the passageway 144 may have any suitable shape. For example the passageway 144 may wind or coil upward and downward in the Z-direction 118 through the folding board 112 such that its effective length is increased to improve heat dissipation.

FIG. 8b depicts another embodiment of a folding board 112 having a passageway 144 disposed therein. In this embodiment, the folding board 112 includes an exposed tube 176 shaped similarly to the outer profile of the embodiment of the folding board 112 depicted in FIG. 8a. For example, in this embodiment the folding board 112 may consist primarily of the exposed tube 176. The tube 176 provides a passageway 144 from an inlet 170 to an outlet 174 through which the cooling system 150 may provide the cooling fluid to dissipate heat from the folding board 112. In this embodiment an outer surface of the folding board 112 comprises an outer surface of the tube 176. A portion of the folding board 112 is simply the exposed tube 176 through which the cooling fluid is provided. For example, the majority of the folding board 112 may be the tube 176.

In the above embodiments, the inlets 170 are illustrated adjacent the leading edge 130, and the outlets 174 are illustrated adjacent the trailing edge 132. However, one of ordinary skill in the art would understand that the inlet 170 and outlet 174 may be configured in any suitable manner such that the flow of the cooling fluid through the passageway 144 dissipates heat from the folding board 112. Although the passageway 144 is illustrated through an upper folding board 112, similar passageways 144 may be disposed in a lower folding board 113. For example, in some embodiments, passageways 144 may be disposed through some or all of the upper and lower folding boards 112, 113 of the folding board assembly 106 illustrated in FIGS. 2-5. Additionally, some or all of the folding boards 112, 113 may be configured as consisting primarily of the exposed tube 176 as shown in FIG. 8b.

In some embodiments, the cooling system 150 may provide the cooling fluid through one or more structures thermally coupled to one of the folding boards 112, 113 or the support structure assembly 128. For example, referring back to FIG. 3, one or more components 129, 131, 133 of the support structure assembly 128 may include a passageway (not shown) disposed therein, and the cooling system 150 may be configured to provide the cooling fluid through the passageway to dissipate heat from the folding board assembly 106. For example, one or more of the plates 114, 116 may be configured as a plenum such that the passageway is a large cavity within the plenum. As used herein, "thermally coupled" means connected such that heat may flow therebetween.

Figure 8E:
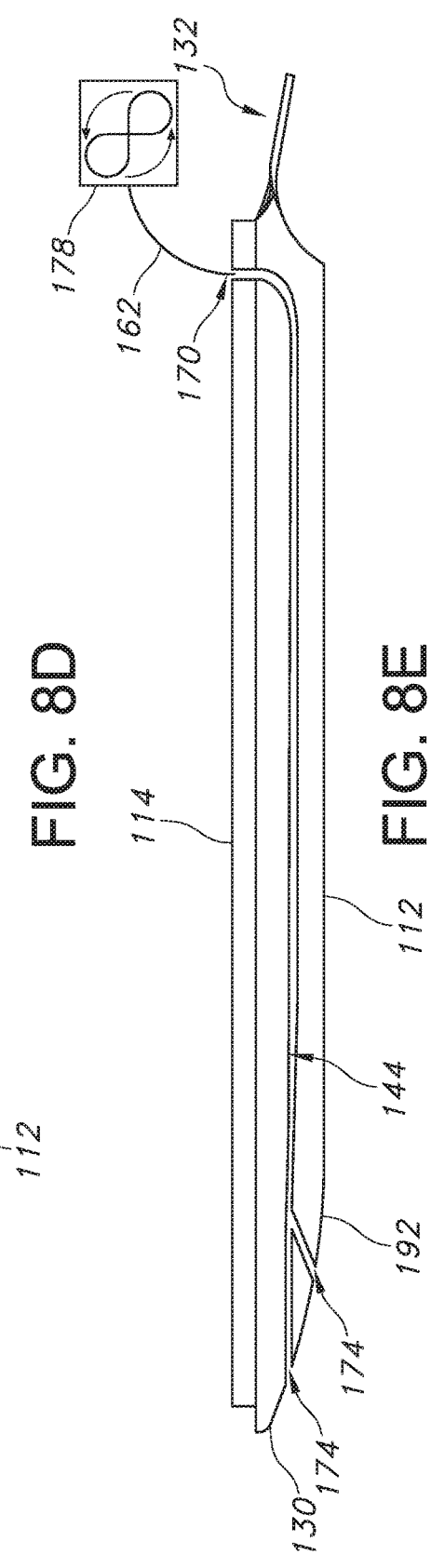

Referring to FIG. 8c, an additional structure 184, which may be separate from the support structure assembly 128, may be thermally coupled directly to one or more of the folding boards 112, 113 and may include a passageway 144 disposed therein. The additional structure 184 may include an inlet 170 and an outlet 174 through which the cooling system 150 is configured to supply the cooling fluid, as explained above. Similarly, in another embodiment as depicted in FIG. 8d, the additional structure 184 may be coupled to the plate 114 to which the folding board 112 is mounted. Alternatively, the additional structure 184 may be thermally coupled with the support structure 128. The additional structure 184 may include a passageway 144, an inlet 170, and an outlet 174. In FIGS. 8d and 8e the passageway 144 is depicted as helically coiled in the machine direction 108. In other embodiments, the passageway 144 may instead snake back and forth in the cross-machine 111. These configurations may improve heat dissipation by increasing the length of the passageway 144 and the contact area between the cooling fluid and the additional structure 184. The passageway 144 through the additional structure 184, however, may have any suitable shape. Similarly the inlet 170 and outlet 174 may be disposed at any suitable location on the additional structure 184 such that the cooling system 150 may provide the flow of the cooling fluid through the passageway 144 to dissipate heat from the folding board assembly 106.

Referring to FIG. 8e, in another embodiment, the cooling system 150 may comprise a fan or blower 178 configured to provide a flow of a gas through one or more passageways 144 disposed within one or more of the folding boards 112, 113, the support structure assembly 128, or the additional structure 184. For example, as shown in FIG. 8e, the blower 178 may be fluidly connected through a conduit 162 with the inlet 170 of the passageway 144. The folding board 112 may include a surface 192 contacting the web 104, and one or more outlets 174 of the passageway 144 may be disposed adjacent the surface 192 such that the gas flows out through the outlets 174. As used herein, "adjacent" refers to both near or on. Thus, in the above embodiment, the outlets 174 of the passageway 144 may be disposed on the surface 192 contacting the web 104. Additionally, although depicted as having two outlets 174, the passageway 144 may have additional outlets 174 disposed along the surface 192 contacting the web 104. For example, the outlets 174 may be disposed at portions of the surface 192 most prone to overheating. In some embodiments, multiple passageways 144 may be disposed within a single folding board 112. Additionally, the cooling system 150 may be configured to cool the gas prior to providing it in the passageway 144 to more effectively cool the folding board 112. The flow of gas from the outlets 174 may also reduce friction between the web 104 and the folding board 112.

In another embodiment, the cooling system 150 may be configured to provide an external flow of air directed at a contact area between at least one of the pairs 115 of folding boards 112, 113 and the web 104. For example, referring back to FIG. 3, the cooling system 150 may comprise a fan or blower 178 positioned adjacent the folding board assembly 106 and configured to provide the external flow of air between the plates 114, 116 to dissipate heat from the folding board assembly 106 through convection.

Figure 8F:
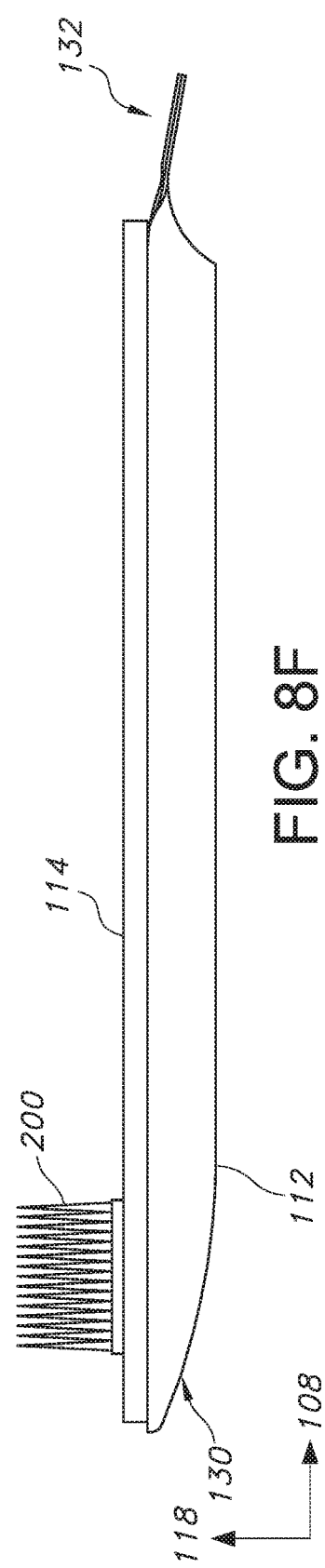

In addition or alternative to the cooling systems 150 described above, the folding board assembly 106 may be designed to more effectively dissipate heat through passive means. For example, one or more thermal fins 200 may be thermally coupled with a component of the folding board assembly 106 such that the thermal fins 200 draw heat from the folding board assembly 106. For example, as shown in FIG. 8f, the thermal fins 200 may be attached to the upper plate 114 of the folding board assembly 106. In other embodiments, however, the thermal fins 200 may be attached directly to the folding boards 112, 113 or any other suitable structure (such as the support structure assembly 128 or the additional structure 184 for example) such that heat flows from the folding boards 112, 113 to the thermal fins 200. Although the thermal fins 200 are illustrated as extending over only a small portion of the length of the folding board 112 in the machine direction 108, the thermal fins 200 may be of any suitable dimensions and may comprise any suitable materials. For example the thermal fins 200 may be made of heat conducting materials such as aluminum, steel, etc. Additionally, a thermal paste or adhesive may be used to adhere the thermal fins 200. Any suitable method may be used to thermally couple the thermal fins 200 such that they improve heat dissipation from the folding board assembly 106 through convection.

Passive and/or forced convection may be used to remove heat from the thermal fins 200. For example, in one embodiment, the blower 178, described with reference to FIG. 3, may be used to provide a flow of air over the thermal fins 200. In some embodiments, a cowling may be located around some or all of the thermal fins 200 to direct the flow of air from the blower 178 over the thermal fins. Such a configuration may improve convection from the thermal fins 200 to the flow of air.

Figure 8G:
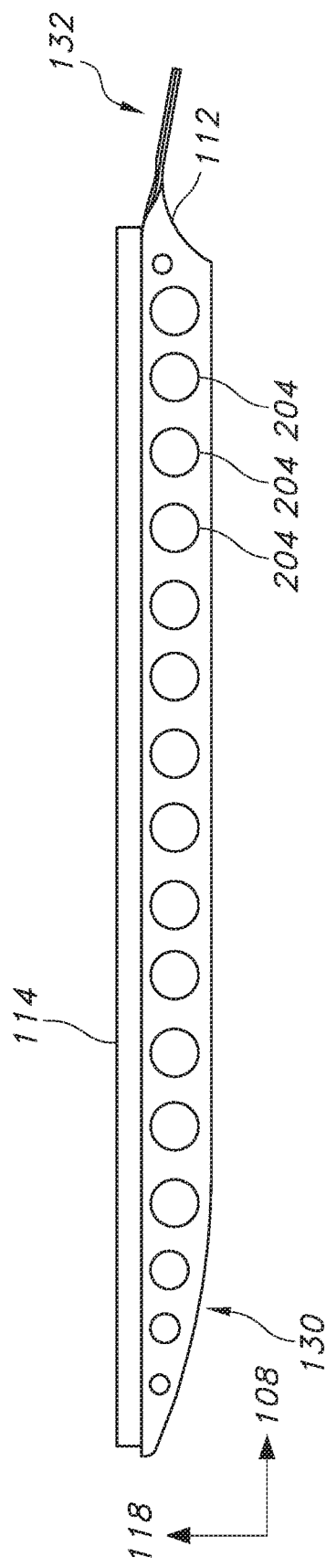

The folding board assembly 106 or folding boards 112, 113 themselves may be designed or configured to improve passive cooling of the folding board assembly 106. For example, FIG. 8g depicts a folding board 112 having multiple holes 204 defined through a portion of the folding board 112. For example, the holes 204 may extend in the cross-machine direction 111. For clarity, only three of the holes 204 are labeled in FIG. 8g. This configuration may improve air circulation through the folding board assembly 106 and thereby improve passive heat dissipation through convection. The discontinuous surface of the folding board 112 may include dimples, bumps, slots, grooves or a combination thereof. As the web 104 passes through the automated production line system 100 the discontinuous surface of the folding board 112 may contact the web 104. In other embodiments, one or more edges of the folding board 112 may have a discontinuous surface that contacts the web 104. For example, leading edge 130 may have a discontinuous surface in some embodiments. The discontinuous surface may include a plurality of holes and bumps or ridges adjacent the holes, for example. Such a configuration may reduce heat generation as the bumps or ridges may reduce the contact area between folding board 112 and the web 104. Similarly, such a configuration may also improve heat dissipation as the holes improve air flow near the contact surface.

Figure 8H:
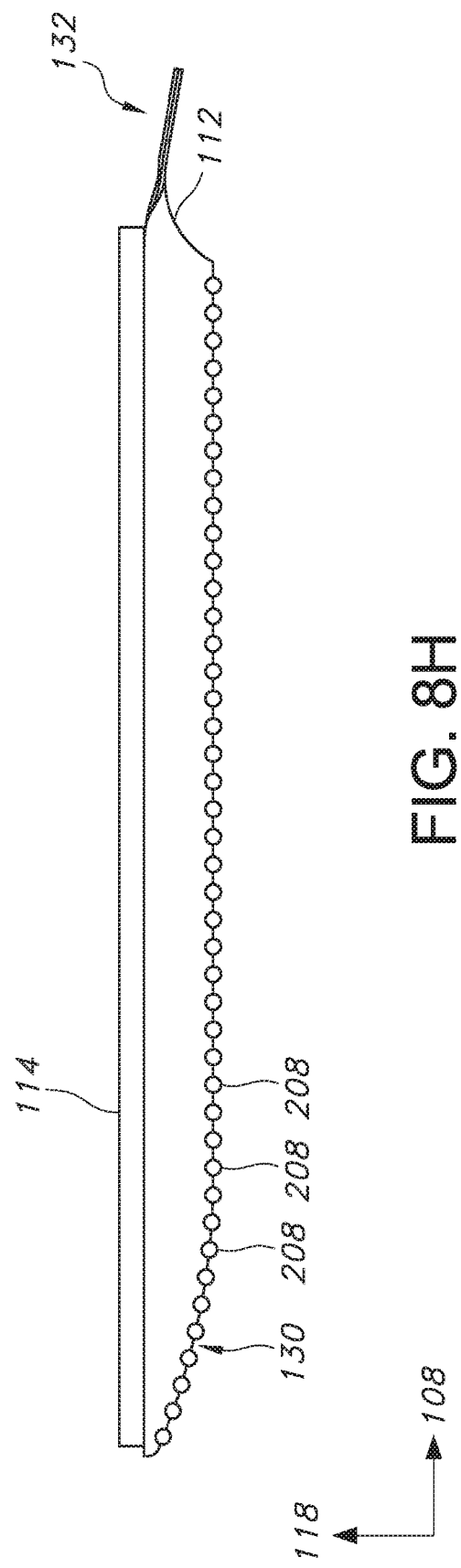

Referring to FIG. 8h, in another embodiment, the folding board 112 includes one or more rollers 208 at an interface between the web 104 and the folding board 112. The rollers 208 are rotatably attached to the folding board 112 and may have any suitable shape and be attached using any suitable method. For example, the rollers 208 may be cylindrical or spherical, and may be attached using axial bearings or, alternatively, may be partially disposed within sockets such that they are free to rotate. The rollers 208 may reduce friction between the web 104 and the folding board 112. For example, as the web 104 is conveyed over the rollers 208, the roller 208 may roll along a surface of the web 104 and prevent or reduce sliding contact between the surface 192 of the web 104 and the folding boards 112, and as a result, the rollers 208 may reduce heat generation at the interface between the folding board 112 and the web 104.

Although the above embodiments are described with reference to a single upper folding board 112, some or all of the folding boards 112, 113 in the folding board assembly 106 depicted in FIGS. 2-5 may be configured as shown in FIGS. 8g-8h. Moreover, any suitable combination of the system and methods described herein may be used in combination. For example, a folding board 112 as described and shown in FIG. 8g may include a passageway through which the cooling system 150 provides a cooling fluid. In such an embodiment, the cooling system 150 may be a closed system providing a flow of a liquid through the passageway. Alternatively, the cooling system may provide a flow of a gas, as described with reference to FIG. 8e, and outlets may be disposed along the inner edge of the folding board 112 which defines the holes 204 shown in FIG. 8e.

In some embodiments, the folding board assembly 106 may include a low friction coating to reduce friction with the web 104. For example the folding board 112 may include such a coating along a portion of the folding board which contacts the web 104. Examples of low friction coating materials include zirconium oxide, Aerolon (a commercially available coating from Tnemec Company, Inc.), ceramics, and engineered plastics.

One of ordinary skill in the art would understand that yet further combinations of the various embodiments described herein are possible and within the scope of this disclosure.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An automated method for forming pleats in a textile product in a production line, comprising:
   conveying a web of the textile product on a conveyor in the production line, wherein the web is conveyed at a rate between about 200 feet per minute and about 900 feet per minute;
   folding the web using a folding board at a folding station in the production line; and
   removing heat from the folding board, wherein removing heat from the folding board includes maintaining the folding board at a temperature less than about 350° F. during production.

2. The automated method of claim 1, wherein removing heat from the folding board includes at least one of providing a stream of air directed at the folding board, providing a flow of a liquid through the folding board, providing the folding board with a discontinuous surface, and providing a thermal fin along at least one of the folding board or a structure thermally connected thereto; wherein removing heat from the folding board includes providing a flow of air directed at an outer surface of the folding board adjacent a contact location where the folding board contacts the web; or wherein removing heat from the folding board includes providing a flow of a fluid through a passageway within the folding board.

3. The automated method of claim 2, wherein the fluid is a gas and exits the passageway through at least one outlet disposed adjacent a contact surface of the folding board, wherein the contact surface of the folding board contacts the web.

4. The automated method of claim 2, wherein removing heat from the folding board includes cooling the fluid.

5. The automated method of claim 4, wherein removing heat from the folding board includes recycling the fluid through a closed circuit.

6. The automated method of claim 2, wherein the fluid is a liquid.

7. An automated production line system for forming pleats in a web of a textile product in a production line, comprising:
   a conveyor on which the web of the textile product is conveyed;
   a folding board assembly including a pair of folding boards, the folding board assembly configured to fold the web as the web passes through the folding board assembly, wherein the folding board assembly is configured to remove heat from at least one of the pair of folding boards; and
   a thermal fin thermally connected to the folding board assembly to remove heat from at least one of the pair of folding boards.

8. The automated production line system of claim 7 wherein the folding board assembly is configured to maintain the pair of folding boards at a temperature less than about 350° F. while the conveyor conveys the web at a rate between about 200 feet per minute and about 900 feet per minute.

9. The automated production line system of claim 7, wherein the folding board assembly includes a cooling system configured to remove heat from at least one of the pair of folding boards using a cooling fluid.

10. The automated production line system of claim 7, wherein the folding board assembly includes a cooling system configured to cool the pair of folding boards using a cooling fluid.

11. The automated production line system of claim 10, wherein at least one of the pair of folding boards includes a passageway through which the cooling system is configured to provide the cooling fluid.

12. The automated production line system of claim 11, further comprising a heat exchanger configured to cool the cooling fluid as the cooling fluid flows through the heat exchanger.

13. The automated production line system of claim 10, further including a structure thermally coupled to at least one of the pair of folding boards, and wherein the cooling system is configured to provide the cooling fluid through the structure.

14. The automated production line system of claim 10, wherein the cooling system is a closed circuit system.

15. The automated production line system of claim 10, wherein the cooling system includes a tube disposed within at least one of the pair of folding boards, and wherein the cooling system is configured to circulate the cooling fluid through the tube.

16. The automated production line system of claim 10, wherein the cooling fluid is a liquid or wherein the cooling fluid is a gas.

17. The automated production line system of claim 16, wherein at least one of the pair of folding boards further includes a surface contacting the web and an outlet disposed adjacent the surface, and wherein the outlet is in fluid communication with a passageway such that the gas flows out through the outlet.

18. The automated production line system of claim 10, wherein the cooling fluid is air and the cooling system is configured to provide an external flow of air directed at a contact area between at least one of the pair of folding boards and the web.

19. The automated production line system of claim 7, wherein at least one of the pair of folding boards has a discontinuous surface, and wherein the folding board assembly includes a low friction coating.

20. The automated production line system of claim 19, wherein the pair of folding boards is arranged such that the discontinuous surface contacts the web, and wherein the discontinuous surface includes dimples, bumps, holes, slots, grooves or a combination thereof.

21. The automated production line system of claim 7, wherein the pair of folding boards are interleaved.

22. The automated production line system of claim 7, wherein at least one of the pair of folding boards includes a roller at an interface between the web and the folding board.

23. The automated production line system of claim 7, wherein the folding board assembly includes a plate generally parallel to a machine direction and a cross-machine direction of the production line, wherein at least one of the pair of folding boards has a leading edge and a trailing edge extending generally in the machine direction, wherein the trailing edge is offset from the leading edge in the cross-machine direction, wherein the leading edge extends from the plate in a direction generally perpendicular to the plate, and wherein the trailing edge is oriented in a direction generally parallel to the plate.

24. An automated production line system for forming pleats in a web of a textile product in a production line, comprising:
- a conveyor on which the web of the textile product is conveyed at a rate between about 200 feet per minute and about 900 feet per minute; and
- a folding assembly including a plurality of rollers configured to fold the web as the web passes through the folding assembly, wherein the folding assembly is configured to maintain the plurality of rollers at a temperature less than about 350° F.

* * * * *